(12) United States Patent
Fukui et al.

(10) Patent No.: US 12,400,804 B2
(45) Date of Patent: Aug. 26, 2025

(54) CAPACITOR ELEMENT, ELECTROLYTIC CAPACITOR, INSULATING MATERIAL, AND METHOD FOR MANUFACTURING MOUNTING SUBSTRATE

(71) Applicant: Panasonic Intellectual Property Management Co., Ltd., Osaka (JP)

(72) Inventors: Hitoshi Fukui, Nara (JP); Katsuhisa Ishizaki, Kyoto (JP); Masamichi Inoue, Osaka (JP); Daisuke Usa, Osaka (JP); Makoto Nagashima, Kyoto (JP); Hiromi Ozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 66 days.

(21) Appl. No.: 17/759,528

(22) PCT Filed: Jan. 26, 2021

(86) PCT No.: PCT/JP2021/002533
§ 371 (c)(1),
(2) Date: Jul. 27, 2022

(87) PCT Pub. No.: WO2021/171866
PCT Pub. Date: Sep. 2, 2021

(65) Prior Publication Data
US 2023/0076194 A1    Mar. 9, 2023

(30) Foreign Application Priority Data

Feb. 26, 2020 (JP) .................................. 2020-030963
Apr. 1, 2020  (JP) .................................. 2020-066079

(51) Int. Cl.
*H01G 9/15* (2006.01)
*H01G 9/012* (2006.01)
(Continued)

(52) U.S. Cl.
CPC ............... *H01G 9/15* (2013.01); *H01G 9/012* (2013.01); *H01G 9/025* (2013.01); *H01G 9/07* (2013.01); *H01G 9/08* (2013.01)

(58) Field of Classification Search
CPC ............ H01G 9/08; H01G 9/07; H01G 9/025; H01G 9/012; H01G 9/15
See application file for complete search history.

(56) References Cited

U.S. PATENT DOCUMENTS

| 2006/0181836 A1* | 8/2006 | Furuzawa ............... H01G 9/15 361/523 |
| 2009/0135550 A1* | 5/2009 | Umemoto ............ H01G 9/0003 361/523 |

(Continued)

FOREIGN PATENT DOCUMENTS

| JP | S54063354 A | * | 5/1979 |
| JP | S58066324 A | * | 4/1983 |

(Continued)

OTHER PUBLICATIONS

International Search Report of PCT application No. PCT/JP2021/002533 dated May 11, 2021.

(Continued)

*Primary Examiner* — David M Sinclair
(74) *Attorney, Agent, or Firm* — Rimon P.C.

(57) ABSTRACT

A capacitor element includes an anode body, a dielectric layer disposed on a surface of the anode body, a solid electrolyte layer covering at least a part of the dielectric layer, a cathode lead-out layer covering at least a part of the solid electrolyte layer, and an insulating member disposed from an outermost surface of the cathode lead-out layer to a depth of more than or equal to 0.001 μm.

33 Claims, 6 Drawing Sheets

(51) Int. Cl.
  *H01G 9/025* (2006.01)
  *H01G 9/07* (2006.01)
  *H01G 9/08* (2006.01)

(56) References Cited

U.S. PATENT DOCUMENTS

| | | | |
|---|---|---|---|
| 2010/0039751 A1* | 2/2010 | Oohata | H01G 9/042 |
| | | | 361/523 |
| 2011/0026190 A1 | 2/2011 | Oohata | |
| 2011/0096467 A1* | 4/2011 | Taketani | H01G 9/08 |
| | | | 29/25.03 |
| 2015/0194270 A1* | 7/2015 | Katsube | H01G 9/14 |
| | | | 29/25.03 |
| 2015/0228412 A1* | 8/2015 | Choi | H01G 9/048 |
| | | | 361/529 |
| 2019/0006116 A1* | 1/2019 | Petrzilek | H01G 9/10 |
| 2019/0392998 A1* | 12/2019 | Petrzilek | H01G 9/028 |
| 2022/0189706 A1* | 6/2022 | Nagai | H01G 9/10 |

FOREIGN PATENT DOCUMENTS

| | | | | |
|---|---|---|---|---|
| JP | 60-225420 | | 11/1985 | |
| JP | 3-040413 | | 2/1991 | |
| JP | 08339942 | A * | 12/1996 | |
| JP | 09045592 | A * | 2/1997 | |
| JP | 11288848 | A * | 10/1999 | |
| JP | 2001-160524 | A | 6/2001 | |
| JP | 2002-134361 | | 5/2002 | |
| JP | 2006-294843 | | 10/2006 | |
| JP | 2007-165777 | | 6/2007 | |
| JP | 2007-305661 | | 11/2007 | |
| JP | 20120-015425 | A | 1/2012 | |
| JP | 2017-017122 | | 1/2017 | |
| WO | 2000/067267 | | 11/2000 | |
| WO | 2007/061005 | | 5/2007 | |
| WO | WO-2018142972 | A1 * | 8/2018 | H01G 9/025 |

OTHER PUBLICATIONS

English Translation of Chinese Office Action dated Jul. 30, 2024 for the related Chinese Patent Application No. 202180015367.9.

English Translation of Chinese Office Action dated Jun. 30, 2025 for the related Chinese Patent Application No. 202180015367.9.

* cited by examiner

110

CAPACITOR ELEMENT, ELECTROLYTIC CAPACITOR, INSULATING MATERIAL, AND METHOD FOR MANUFACTURING MOUNTING SUBSTRATE

CROSS-REFERENCE TO RELATED APPLICATIONS

This application is a U.S. national stage application of the PCT International Application No. PCT/JP2021/002533 filed on Jan. 26, 2021, which claims the benefit of foreign priority of Japanese patent application No. 2020-030963 filed on Feb. 26, 2020 and Japanese patent application No. 2020-066079 filed on Apr. 1, 2020, the contents all of which are incorporated herein by reference.

TECHNICAL FIELD

The present disclosure relates to a capacitor element, an electrolytic capacitor, an insulating material, and a method for manufacturing a mount board.

BACKGROUND

An electrolytic capacitor includes a capacitor element including a solid electrolyte layer, a lead frame electrically connected to the capacitor element, and an exterior body sealing the capacitor element. The capacitor element includes, for example, an anode body including a porous part on a surface layer, a dielectric layer disposed on at least a part of a surface of the anode body, a solid electrolyte layer covering at least a part of the dielectric layer, and a cathode lead-out layer covering at least a part of the solid electrolyte layer.

Unexamined Japanese Patent Publication No. 2007-165777 proposes an electrolytic capacitor including a plurality of capacitor elements each including an anode part made of a valve metal having an oxide film layer formed on a surface thereof, a cathode part including a solid electrolyte layer in a predetermined region of the surface, the cathode part being formed in a layer shape whose outermost layer is made of a conductive material, and a resist part electrically insulating the anode part and the cathode part.

International Publication WO 2007/061005 proposes an electrolytic capacitor including a shielding layer in a region separating an anode region and a cathode region of a base material for an electrolytic capacitor having a porous layer on a surface.

International Publication WO 2000/067267 proposes a method for manufacturing an electrolytic capacitor including a step of applying a solution of a masking material solution that penetrates into a dielectric film and forms a masking layer in a penetrated part.

Unexamined Japanese Patent Publication No. 2007-305661 proposes that a resist layer for preventing penetration of a solid electrolyte material is provided on an etching layer formed on a surface of a valve metal to define an anode part and a cathode part. It also proposes that a first groove is formed on the cathode part side of the resist layer, a second groove is formed closer to the anode part side than the first groove, and a resist layer is formed on the second groove.

SUMMARY

A capacitor element according to a first aspect of the present disclosure includes an anode body, a dielectric layer disposed on a surface of the anode body, a solid electrolyte layer covering at least a part of the dielectric layer, a cathode lead-out layer covering at least a part of the solid electrolyte layer, and an insulating member disposed from an outermost surface of the cathode lead-out layer to a depth of more than or equal to 0.001 μm.

A capacitor element according to a second aspect of the present disclosure includes an anode body, a dielectric layer disposed on a surface of the anode body, a solid electrolyte layer covering at least a part of the dielectric layer, a cathode lead-out layer covering at least a part of the solid electrolyte layer, and an insulating member disposed on at least a part of at least one of a surface of the capacitor element or an inside of the capacitor element. At least a part of the insulating member has fluidity at a temperature of more than or equal to 230° C.

An electrolytic capacitor according to a third aspect of the present disclosure includes the capacitor element described above, and an exterior body that seals the capacitor element.

An insulating material for an electrolytic capacitor according to a fourth aspect of the present disclosure includes a first curable resin. A cured product of the first curable resin has a glass transition temperature of less than or equal to 150° C.

A method for manufacturing a mount board according to a fifth aspect of the present disclosure includes a step of preparing a substrate on which the electrolytic capacitor is mounted, and a step of heating the electrolytic capacitor at a temperature of more than or equal to 230° C.

According to the present disclosure, it is possible to improve the heat-resistant reliability of an electrolytic capacitor.

DESCRIPTION OF EMBODIMENT

Figure 1:
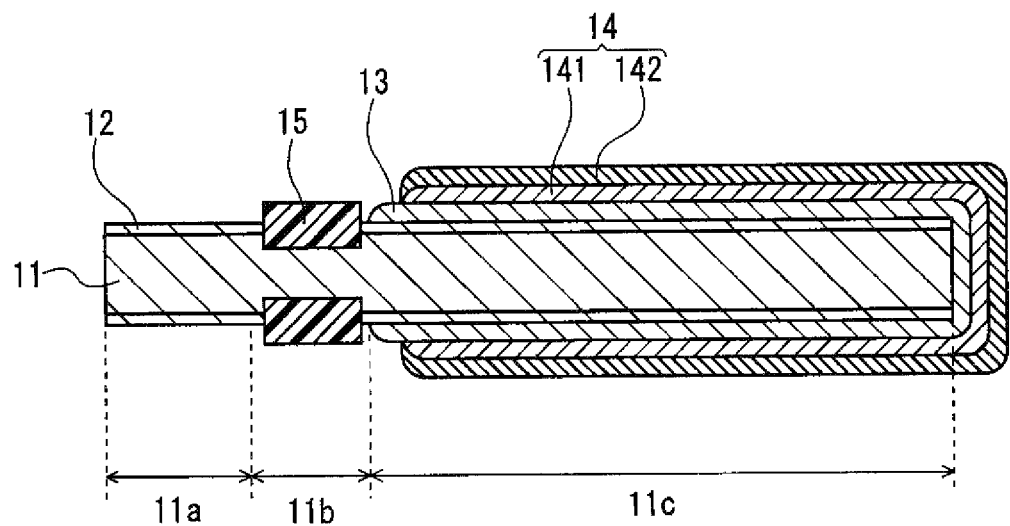
FIG. 1 is a sectional view schematically illustrating a capacitor element according to an exemplary embodiment of the present disclosure.

Prior to the description of the exemplary embodiments, problems in the conventional technology will be briefly described below.

In an electrolytic capacitor, there is a case in which air enters inside through the porous part of the anode body connected to the lead frame. When oxygen in the air entered inside contacts the solid electrolyte layer included in the capacitor element, the solid electrolyte layer deteriorates under high temperature, which causes the electrostatic capacitance of the electrolytic capacitor to decrease and the equivalent series resistance (ESR) to increase.

In addition, the electrolytic capacitor is usually joined using solder to the substrate through a reflow step. In this reflow step, a minute crack may be generated in the exterior body. When oxygen enters the inside through the crack, the solid electrolyte layer deteriorates under high temperature.

In view of the above problems, the present disclosure provides a capacitor element that can improve heat-resistant reliability of an electrolytic capacitor, an electrolytic capacitor, an insulating material, and a method for manufacturing a mount board.

[Capacitor element]

A capacitor element according to the present exemplary embodiment includes an anode body, a dielectric layer disposed on a surface of the anode body, a solid electrolyte layer covering at least a part of the dielectric layer, a cathode lead-out layer covering at least a part of the solid electrolyte layer, and an insulating member disposed from an outermost surface of the cathode lead-out layer to a depth of more than or equal to 0.001 µm.

The capacitor element according to the present exemplary embodiment includes an anode body, a dielectric layer disposed on a surface of the anode body, a solid electrolyte layer covering at least a part of the dielectric layer, a cathode lead-out layer covering at least a part of the solid electrolyte layer, and an insulating member disposed on at least a part of at least one of a surface of the capacitor element or an inside of the capacitor element. At least a part of the insulating member has fluidity at a temperature of more than or equal to 230° C.

Usually, the peak temperature of the reflow step is more than or equal to 230° C. Thus, the meaning that at least a part of the insulating member has fluidity at a temperature of more than or equal to 230° C. is synonymous with the meaning that at least a part of the insulating member flows in the reflow step.

That is, the insulating member according to the present exemplary embodiment flows so as to be dispersed in the exterior body at the time of reflow, and can close minute cracks generated in the exterior body. This causes the oxygen blocking property of the electrolytic capacitor to improve and as a result the heat resistance to improve. The material of the exterior body hardly penetrates into the cathode lead-out layer in view of its purpose.

The meaning of having fluidity is synonymous with the meaning of having a melt flow rate (MFR) of more than or equal to 1 g/10 min. The MFR of the insulating member is preferably more than or equal to 10 g/10 minutes. The MFR is measured in accordance with ISO 1133 under the conditions of a temperature of 230° C. and a load of 2.16 kg.

When the insulating member is dispersed in the exterior body, the insulating member preferably has excellent adhesion to the exterior case. For example, the insulating member and the exterior body preferably contain resins having good compatibility (for example resins having similar molecular structures).

The insulating member may contain a first curable resin. In this case, the glass transition temperature (Tg) of the cured product of the first curable resin is preferably less than or equal to 150° C. By making the Tg of the first curable resin be sufficiently lower than 230° C., at least a part of the insulating member is able to flow at a temperature of more than or equal to 230° C. The Tg of the cured product of the first curable resin is more preferably less than or equal to 140° C., more preferably less than or equal to 130° C., and particularly preferably less than or equal to 120° C.

The Tg is determined by differential thermal analysis (DTA) evaluated in accordance with JIS K 0129. The differential thermal analysis may be performed with an apparatus including an atomic force microscope (AFM). The AFM enables differential thermal analysis in a minute range.

The insulating member may contain the first curable resin as a cured product, a half-cured product, or an uncured product. The insulating member may be, for example, a mixture of at least one of a cured product, a half-cured product, and an uncured product of the first curable resin, a curing agent, and other additive agents.

The first curable resin is not limited to particular resins as long as the insulating member containing the first curable resin has fluidity at a temperature of more than or equal to 230° C. The first curable resin may be either a thermosetting resin or a photocurable resin. The photocurable resin may be cured by visible light or ultraviolet light. Examples of the first curable resin include an epoxy resin, polyimide, a silicon resin, a phenol resin, a urea resin, a melamine resin, an unsaturated polyester, a furan resin, polyurethane, a silicon resin (silicone), a curable acrylic resin, and a photoresist. One kind of the first curable resin may be used singly, or two or more kinds thereof may be used in combination.

The first curable resin preferably contains a bifunctional epoxy resin from the viewpoint that the Tg tends to be low. The first curable resin may contain a curable resin other than the bifunctional epoxy resin, but the proportion thereof is preferably small. The proportion of the bifunctional epoxy resin in the first curable resin is preferably more than or equal to 95 mass %. One kind of the bifunctional epoxy resin is used singly or two or more kinds thereof are used in combination.

Examples of the epoxy resin other than the bifunctional epoxy resin include polycyclic aromatic epoxy resins such as naphthalene epoxy resins; and novolac epoxy resins.

Among them, the first curable resin preferably contains a bisphenol type epoxy resin. Containing a bisphenol type epoxy resin causes the insulating member to be easily adhered to other members of the electrolytic capacitor, for example, the exterior body and the lead frame, and thus the oxygen blocking property is further improved. The bisphenol type epoxy resin has a basic skeleton in which two phenyl groups are bonded via a hydrocarbon group or the like.

Examples of the bisphenol type epoxy resin include a bisphenol A type epoxy resin, a bisphenol F type epoxy resin, a bisphenol S type epoxy resin, a bisphenol AD type epoxy resin, a hydrogenated bisphenol A type epoxy resin, and a hydrogenated bisphenol F type epoxy resin.

The epoxy equivalent of the bisphenol type epoxy resin is not limited to particular values, and may be, for example, more than or equal to 100 and less than or equal to 500. When the epoxy equivalent is within the above range, the adhesiveness of the insulating member tends to be further improved. The molecular weight (weight-average molecular weight) of the bisphenol type epoxy resin is not limited to particular values, and may be, for example, more than or equal to 280 and less than or equal to 1000. When the molecular weight of the epoxy resin within the above range, the epoxy equivalent tends to be in the above range.

From the viewpoint of fluidity and adhesiveness during reflow, the first curable resin preferably contains a bisphenol A type epoxy resin or a bisphenol F type epoxy resin as the bisphenol type epoxy resin. The proportion of the bisphenol type epoxy resin in the first curable resin is preferably 95 mass % or more. One kind of the bisphenol type epoxy resin is used singly or two or more kinds thereof are used in combination.

The insulating member may be a resin composition containing the first curable resin. The resin composition may contain, for example, the first curable resin, a curing agent, a curing accelerator, a flame retardant, a filler, a coupling agent, a colorant, a release agent, and an inorganic ion scavenger.

Examples of the curing agent include acid anhydride-based curing agents such as tetrahydrophthalic acid anhydride, hexahydrophthalic acid anhydride, methyltetrahydrophthalic acid anhydride, nadic acid anhydride, methylnadic acid anhydride, trialkyltetrahydrophthalic acid anhydride, methylcyclohexenetetracarboxylic acid dianhydride, hydrogenated methylnadic acid anhydride, phthalic acid anhydride, trimellitic acid anhydride, pyromellitic acid anhydride, benzophenonetetracarboxylic acid dianhydride, ethylene glycol bisanhydrotrimellitate, glyceryl bis(anhydrotrimellitate)monoacetate, dodecenyl succinic acid anhydride, aliphatic dibasic acid polyanhydride, trialkyltetraphthalic acid anhydride, and chlorendic acid anhydride; imidazole-based curing agents such as 2-ethyl-4-methylimidazole, 2-phenylimidazole, 1-(2-cyanoethyl)-2-ethyl methylimidazole, 2,4-diamino-6-[2-methylimidazolyl-(1)]ethyl-s-triazine, 2-phenylimidazoline, and 2,3-dihydro-1H-pyrrolo[1,2-a]benzimidazole; novolac phenol resin; and aromatic amines.

Examples of the curing accelerator include phosphorus curing accelerators typified by tertiary phosphines such as triphenylphosphine, and quaternary phosphonium salts such as tetraphenylphosphonium tetraphenylborate, tetraphenylphosphonium tetra-p-methylphenylborate, tetraphenylphosphonium thiocyanate, and tetrabutylphosphonium decanoate; and nitrogen-based curing accelerators typified by diazabicycloundecene, imidazole compounds, and dicyandiamide.

Examples of the filler include silica such as fused silica, talc, calcium carbonate, and aluminum oxide. The surface of the filler may be treated with a silane coupling agent.

Examples of the inorganic ion scavenger include ion trapping agents that trap metal ions such as Zr, Sb, Bi, Mg, and Al.

Examples of the resin other than the first curable resin that may be contained in the insulating member include a thermoplastic resin (for example, polyamide, polyamide-imide, polyolefin, polyester, thermoplastic polyimide).

The insulating member is disposed on at least a part of at least one of the surface of the capacitor element or the inside of the capacitor element. At least a part of the insulating member may be disposed on the surface of the cathode lead-out layer. At least a part of the insulating member may be disposed inside the cathode lead-out layer.

The cathode lead-out layer is usually not dense but has a void. Consequently, oxygen may enter the inside from the cathode lead-out layer, and thus the solid electrolyte layer may deteriorate. By disposing the insulating member on at least one of the surface of the cathode lead-out layer or inside of the cathode lead-out layer, the entry path of oxygen can be effectively closed. Hereinafter, the insulating member disposed on at least a part of at least one of the surface the cathode lead-out layer or the inside of the cathode lead-out layer is referred to as a first insulating member.

The first insulating member is preferably disposed from the outermost surface of the cathode lead-out layer to a depth of more than or equal to 0.001 µm. By disposing the first insulating member in this form, the entry of oxygen can be more effectively suppressed.

The first insulating member is disposed from the outermost surface of the cathode lead-out layer to a depth of preferably more than or equal to 0.01 µm, and more preferably to a depth of more than or equal to 0.1 µm. The penetration depth of the first insulating member is up to 80% of the thickness of the cathode lead-out layer from the outermost surface. The penetration depth within this range allows the oxygen blocking property to be exhibited sufficiently.

The cathode lead-out layer may include, on the outermost surface, a metal paste layer containing a metallic material. In this case, the first insulating member is disposed so as to fill the inside of the metal paste layer, for example, a gap between the metallic materials. From the viewpoint of oxygen blocking property, in the metal paste layer, the ratio of the elements derived from the first insulating member to the elements derived from the metallic material is preferably more than or equal to 65 atom %, more preferably more than or equal to 66 atom %, and particularly preferably more than or equal to 67 atom %. From the viewpoint of electric resistance, the ratio of the elements derived from the first insulating member to the elements derived from the metallic material is preferably less than or equal to 300 atom %, and more preferably less than or equal to 290 atom %.

The position of the first insulating member can be evaluated by elemental analysis using an electron probe microanalyzer (EPMA) or an analysis method such as fluorescent X-ray analysis, Raman spectroscopy, Fourier transform infrared spectroscopy (FT-IR), or atomic absorption spectroscopy. When the first insulating member is formed of a resin composition, the distribution of the elements derived from the resin composition (for example, C, O, Cl, N, S, and the like) in a section of the capacitor element may be checked by the above method.

The ratio of the elements derived from the first insulating member to the elements derived from the metallic material in the metal paste layer can also be evaluated by the above analysis method. When the metal paste layer contains a binder resin, the analysis result may also contain elements derived from the binder resin. Since the amount of the binder resin is small, the analysis result obtained by evaluating the elements derived from the resin composition can be regarded as a result obtained by evaluating the elements derived from the first insulating member.

The metal paste layer may contain a binder resin. The presence or absence of the first insulating member can be checked in this case as well. First, the thickness of the metal paste layer is divided into a first region up to 20% of the thickness of the metal paste layer from the surface on the solid electrolyte layer side and a second region other than the first region. The binder resin is usually disposed thin and substantially uniformly over the entire metal paste layer and has a small and uniform concentration. On the other hand, the first insulating member is unevenly distributed much near the surface of the metal paste layer, and its concentration decreases from the surface toward the inside of the metal paste layer. Hence, when the elements derived from the resin composition are mapped on a section of the metal paste layer, the elements confirmed in the first region can be regarded as being derived from the binder resin. The concentration of the first insulating member is higher than the concentration of the elements in the first region. That is, it can be considered that the first insulating member is disposed in a region where the concentration of the elements is higher than the concentration of the elements in the first region.

The penetration depth of the first insulating member is a length from a free-selected point on the outermost surface of the cathode lead-out layer to a farthest point from the outermost surface of the cathode lead-out layer in a region where the first insulating material is disposed as determined above, the farthest point being on a straight line drawn in the thickness direction of the cathode lead-out layer from the free-selected point as a starting point. The above length is measured at any five points, and an average value thereof is taken as the penetration depth of the first insulating member.

When the first insulating member contains the first curable resin, a cured product of the first curable resin is preferably disposed near the surface of the cathode lead-out layer. This is because the entry of oxygen is more effectively inhibited. The cured product of the first curable resin is disposed from the outermost surface of the cathode lead-out layer to a depth of preferably more than or equal to 0.001 μm, further preferably more than or equal to 0.01 μm, particularly preferably more than or equal to 0.5 μm.

The degree of curing of the first curable resin can be evaluated by, for example, FT-IR. For example, when the first curable resin contains an uncured product of epoxy resin, a strong peak derived from the uncured product is observed in a range from 900 $cm^{-1}$ to 1000 $cm^{-1}$, inclusive.

From the viewpoint of oxygen blocking property, the first insulating member preferably covers at least a part of the surface of the cathode lead-out layer. The first insulating member may cover the entire surface of the cathode lead-out layer. When one principal surface of the capacitor element is viewed, the first insulating member preferably occupies more than or equal to 80% of the area of the cathode lead-out layer.

The thickness of the first insulating member covering the surface of the cathode lead-out layer is not limited to particular values. From the viewpoint of oxygen blocking property, the thickness of the first insulating member covering the surface of the cathode lead-out layer is preferably more than or equal to 0.01 μm, more preferably more than or equal to 0.05 μm, and particularly preferably more than or equal to 1 μm. The first insulating member covering the surface of the cathode lead-out layer is preferably a cured product of the first curable resin.

The thickness of the first insulating member covering the surface of the cathode lead-out layer is an average value of the thicknesses of the first insulating member at any five points on the outermost surface of the cathode lead-out layer.

The anode body includes an anode part where the solid electrolyte layer is not formed, a cathode formation part where the solid electrolyte layer is formed, and a separation part between the anode part and the cathode formation part. In the cathode formation part, the solid electrolyte layer and the cathode lead-out layer are sequentially formed. The anode body includes a porous part on the principal surface side.

From the viewpoint of oxygen blocking property, at least a part of the insulating member may be disposed on the surface of the anode part. At least a part of the insulating member may be disposed inside the anode part. Hereinafter, the insulating member disposed on at least a part of at least one of the surface of the anode part or the inside of the anode part is referred to as a second insulating member.

The second insulating member is disposed from the outermost surface of the anode part to a depth of preferably more than or equal to 0.001 μm, further preferably more than or equal to 0.01 μm, particularly preferably more than or equal to 1 μm.

The second insulating member preferably covers at least a part of the surface of the anode part. The second insulating member may cover the entire surface of the anode part. When one principal surface of the capacitor element is viewed, the second insulating member preferably occupies more than or equal to 80% of the area of the anode part. The thickness of the second insulating member covering the surface of the anode part is not limited to particular values. From the viewpoint of oxygen blocking property, the thickness of the second insulating member covering the surface of the anode part is preferably more than or equal to 0.01 μm, more preferably more than or equal to 0.05 μm, and still more preferably more than or equal to 1 μm.

From the viewpoint of oxygen blocking property, at least a part of the insulating member may be disposed on the surface of the separation part. At least a part of the insulating member may be disposed inside the separation part. Hereinafter, the insulating member disposed on at least a part of at least one of the surface of the separation part or the inside of the separation part is referred to as a third insulating member.

The third insulating member is disposed from the outermost surface of the separation part to a depth of preferably more than or equal to 0.001 μm, further preferably more than or equal to 0.01 μm, particularly preferably more than or equal to 1 μm.

The third insulating member preferably covers at least a part of the surface of the separation part. The third insulating member may cover the entire surface of the separation part. When one principal surface of the capacitor element is viewed, the third insulating member preferably occupies more than or equal to 80% of the area of the separation part. The thickness of the third insulating member covering the surface of the separation part is not limited to particular values. From the viewpoint of oxygen blocking property, the thickness of the third insulating member covering the surface of the separation part is preferably more than or equal to 0.01 μm, more preferably more than or equal to 0.05 μm, and still more preferably more than or equal to 1 μm.

At least a part of the surface of the separation part may be covered with a separating member having insulating property instead of the third insulating member or together with the third insulating member. This makes it easy to prevent a short circuit between the anode part and the cathode lead-out layer. The thickness of the separating member is not limited to particular values, and may be, for example, from 0.5 μm to 100 μm inclusive, or from 10 μm to 50 μm inclusive.

The insulating member is preferably disposed on the surface of the cathode lead-out layer and the surface of the anode part. This makes it easy to inhibit the entry of oxygen from outside. The insulating member is preferably disposed inside the cathode lead-out layer, inside the anode part, and inside the separation part. This makes it easy to inhibit oxygen inside the capacitor element from penetrating. The insulating member is preferably disposed at a junction with a lead frame described later on a surface of the capacitor element. This makes it difficult to generate a gap between the lead frame and the exterior body and makes it easy to inhibit the entry of oxygen from outside.

The positions of the second insulating member and the third insulating member can also be evaluated by elemental analysis using EPMA or an analysis method such as fluorescent X-ray analysis, Raman spectroscopy, FT-IR, or atomic absorption spectroscopy. The distribution of the elements (for example, C, O, Cl, N, S, and the like) derived from each insulating member may be confirmed by the above method.

The penetration depth of the second insulating member can also be obtained in the same manner as the penetration depth of the first insulating member. That is, the depth is a length from a free-selected point on the outermost surface of the anode part to a farthest point from the outermost surface of the anode part in a region where the second insulating member is disposed, the farthest point being on a straight line drawn in the thickness direction of the anode part from the free-selected point as a starting point. The above length is measured at any five points, and an average value thereof is taken as the penetration depth of the second insulating member. The penetration depth of the third insulating member can also be obtained in the same manner by replacing the anode part with the separation part. The thickness of the second insulating member covering the surface of the anode part is an average value of the thicknesses of the second insulating member at any five points on the outermost surface of the anode part. The thickness of the third insulating member covering the surface of the separation part can also be obtained in the same manner as described above by replacing the anode part is with the separation part.

The compositions of the second insulating member and the third insulating member may be the same as or different from the composition of the first insulating member.

Hereinafter, a capacitor element according to the present exemplary embodiment will be specifically described with reference to the drawings. However, the present exemplary embodiment is not limited thereto.

FIG. 1 is a sectional view schematically illustrating the capacitor element according to the present exemplary embodiment. In FIG. 1, an insulating member is omitted for convenience.

Capacitor element 110 has, for example, a sheet shape. Capacitor element 110 includes anode body 11, dielectric layer 12 covering at least a part of anode body 11, solid electrolyte layer 13 covering at least a part of the dielectric layer, and cathode lead-out layer 14 covering at least a part of solid electrolyte layer 13. Cathode lead-out layer 14 includes carbon layer 141 and metal paste layer 142.

Anode body 11 includes anode part 11a, separation part 11b, and cathode formation part 11c. A porous part (not illustrated) is disposed on both principal surface sides of anode body 11. A core (not illustrated) is interposed between the two porous parts. A thin-walled part is formed in a part of the separation part 11b. Separating member 15 is disposed on the surface of the thin-walled part.

Figure 2:
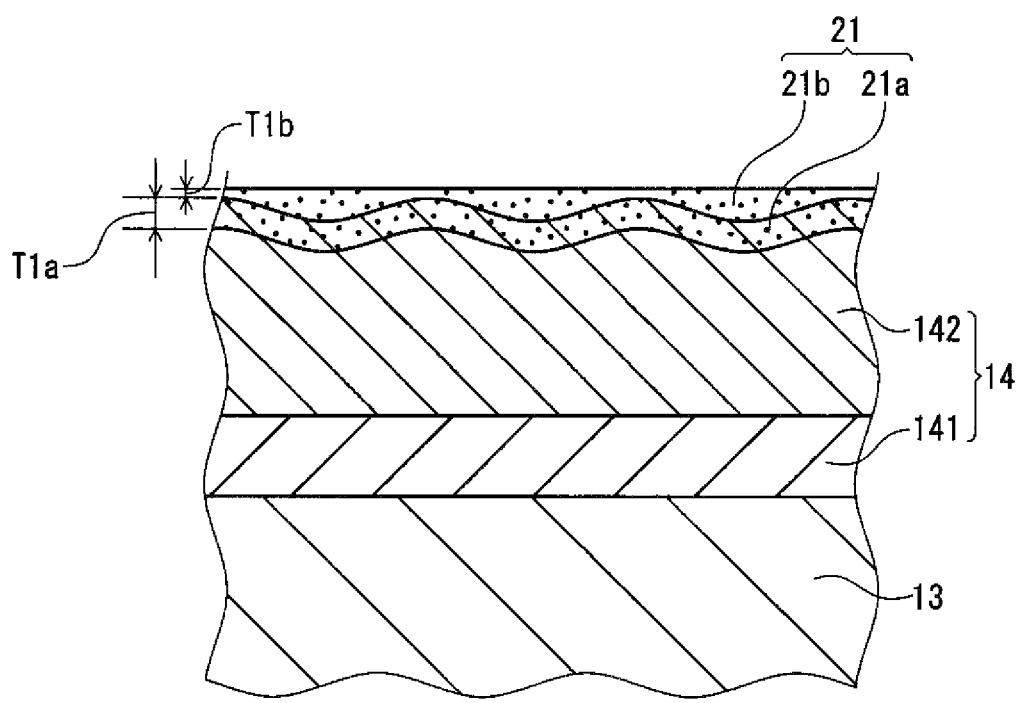
FIG. 2 is a sectional view schematically illustrating a main part of a capacitor element according to an exemplary embodiment of the present disclosure.

FIG. 2 is a sectional view schematically illustrating a main part of the capacitor element according to the present exemplary embodiment. In FIG. 2, a part of the solid electrolyte layer, a part of the cathode lead-out layer, and the first insulating member are illustrated for convenience.

First insulating members 21 (21a and 21b) are disposed inside and on a surface of metal paste layer 142. First insulating member 21a is disposed from the outermost surface of metal paste layer 142 constituting cathode lead-out layer 14 to depth T1a. First insulating member 21a is disposed so as to fill a void formed inside metal paste layer 142. The surface of metal paste layer 142 is further covered with first insulating member 21b having a thickness T1b. This inhibits oxygen from entering the cathode lead-out layer and inhibits the solid electrolyte layer from deteriorating.

Figure 3:
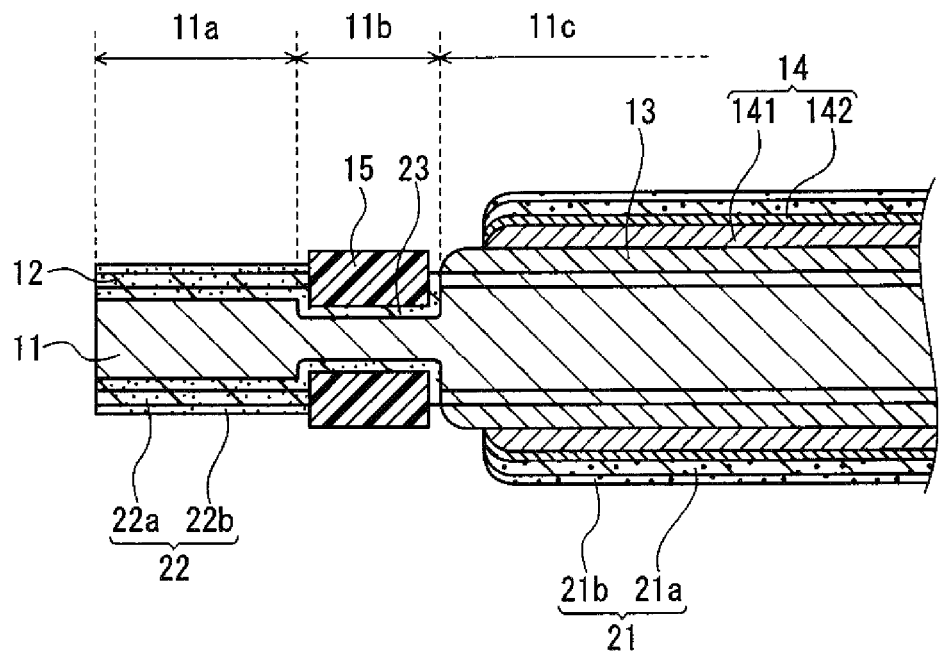
FIG. 3 is a sectional view schematically illustrating a part of a capacitor element according to an exemplary embodiment of the present disclosure.

FIG. 3 is a sectional view schematically illustrating a part of the capacitor element according to the present exemplary embodiment. In FIG. 3, a part including an end of the capacitor element on the anode part side is illustrated for convenience.

First insulating member 21a and first insulating member 21b are disposed inside and on the surface of metal paste layer 142, respectively. Second insulating member 22a and second insulating member 22b are disposed inside and on the surface of anode part 11a, respectively. Second insulating member 22a penetrates into anode part 11a beyond dielectric layer 12. The surface of anode part 11a is further covered with second insulating member 22b. Separating member 15 is disposed on the thin-walled part of separation part 11b. Third insulating member 23 enters under separating member 15 and penetrates into separation part 11b. This inhibits oxygen from entering the anode part, the separation part, and the cathode lead-out layer and thus makes it easy to inhibit the solid electrolyte layer from deteriorating.

(Anode Body)

The anode body includes a foil (metal foil) containing a valve metal as a conductive material or a molded body or sintered body of particles containing a valve metal. The molded body or the sintered body has a porous structure. Examples of the valve metal include titanium, tantalum, aluminum, and niobium. The anode body contains one or more kinds of the above valve metals. The anode body may contain the above valve metals in the form of an alloy or an intermetallic compound. A thickness of the anode body is not limited to particular values. The thickness of the anode body other than the thin-walled part ranges, for example, from 15 µm to 300 µm, inclusive, and may range from 80 µm to 250 µm, inclusive. The thickness of the anode body as a molded body or a sintered body ranges, for example, from 15 µm to 5 mm, inclusive.

A principal surface of the anode body is roughened by electrolytic etching or the like. The anode body therefore includes a porous part formed on a principal surface side thereof. The entire anode body may be porous. From the viewpoint of strength, the anode body preferably includes a porous part disposed on both principal surface sides and a core interposed between the porous parts. The core has a lower porosity than the porous part. The porous part is a region having a large number of fine pores. The core is, for example, a region that has not been subjected to electrolytic etching.

(Dielectric Layer)

The dielectric layer is formed on at least a part of the surface of the anode body. The dielectric layer is formed, for example, by anodizing the surface of the anode body with an anodizing treatment or the like. The dielectric layer therefore can contain an oxide of the valve metal. For example, when aluminum is used as the valve metal, the dielectric layer may contain $Al_2O_3$. The dielectric layer is not limited to this as long as it functions as a dielectric material.

(Solid Electrolyte Layer)

The solid electrolyte layer only has to be formed to cover at least a part of the dielectric layer, and may be formed to cover the entire surface of the dielectric layer.

The solid electrolyte layer contains, for example, a manganese compound or a conductive polymer. Examples of the conductive polymer include polypyrrole, polythiophene, polyfuran, polyaniline, polyacetylene, polyphenylene, polyphenylene vinylene, polyacene, and polythiophene vinylene. These polymers may be used singly, may be used in combination of two or more kinds thereof, or may be a copolymer of two or more kinds of monomers.

In the present specification, polypyrrole, polythiophene, polyfuran, polyaniline, and the like mean polymers respectively having polypyrrole, polythiophene, polyfuran, polyaniline, and the like as a basic skeleton. Polypyrrole, polythiophene, polyfuran, polyaniline, and the like therefore may also include derivatives thereof. For example, polythiophene contains poly(3,4-ethylenedioxythiophene) and the like.

The conductive polymer may be contained in the solid electrolyte layer together with a dopant. The dopant may be a monomolecular anion or may be a polymeric anion. Specific examples of the monomolecular anion include p-toluenesulfonic acid and naphthalenesulfonic acid. Specific examples of the polymeric anion include polyvinylsulfonic acid, polystyrenesulfonic acid, polyallylsulfonic acid, polyacrylsulfonic acid, polymethacrylsulfonic acid, poly (2-acrylamido-2-methylpropanesulfonic acid), polyisoprenesulfonic acid, and polyacrylic acid. These anions may be used singly, or may be used in combination of two or more kinds thereof. These anions may be a polymer of a single monomer or a copolymer of two or more kinds of monomers. Among them, a polymeric anion derived from polystyrenesulfonic acid is preferable.

(Cathode Lead-Out Layer)

The cathode lead-out layer only has to be formed to cover at least a part of the solid electrolyte layer, and may be formed to cover the entire surface of the solid electrolyte layer.

The cathode lead-out layer includes, for example, a carbon layer and a metal (for example, silver) paste layer formed on a surface of the carbon layer. The cathode lead-out layer is not limited to this configuration and is satisfactory as long as the cathode lead-out layer has a function of current collection.

<Carbon Layer>

The carbon layer contains a carbon material and has conductivity. The carbon material is not limited to particular kinds. Examples of the carbon material include graphite, carbon black, graphene pieces, and carbon nanotubes.

The carbon layer may contain a binder resin, an additive agent, and the like as necessary. The binder resin is not limited to particular kinds, and examples thereof include a known binder resin used for producing a capacitor element. Examples of the binder resin include the thermoplastic resin and the curable resin described above. Examples of the additive agent include a dispersant, a surfactant, an antioxidant, a preservative, a base, and an acid.

<Metal Paste Layer>

The metal paste layer contains a metallic material. The metallic material is not limited to particular kinds. From the viewpoint of conductivity, the metallic material may contain silver.

The shape of the metallic material is not limited to particular shapes. The metallic material may include spherical or scaly metal particles. The average aspect ratio of the spherical metal particles (hereinafter referred to as spherical particles) is, for example, less than 1.5. The average aspect ratio of the scaly metallic material is, for example, more than or equal to 1.5, and more than or equal to 2. The first insulating member is disposed so as to fill a gap between these metal particles for example.

The proportion of the metallic material by volume in the metal paste layer is not limited to particular values as long as it exceeds 0%. From the viewpoint that the resistance tends to be small, the proportion by volume may be more than or equal to 60%, may be more than or equal to 70%, or may be more than or equal to 80%.

The metal paste layer may further contain a binder resin. The proportion concentration of the binder resin by volume in the metal paste layer is not limited to particular values. From the viewpoint of electric resistance, the proportion of the binder resin by volume in the metal paste layer may be less than or equal to 60%, may be less than or equal to 20%, or less than or equal to 10%. The proportion by volume may be more than or equal to 0.1%. The proportion by volume may be 0%. The proportion of each component by volume in the metal paste layer can be checked by, for example, energy dispersive X-ray spectroscopy (SEM-EDX).

The thickness of the metal paste layer is not limited to particular values. The thickness of the metal paste layer may range, for example, from 0.1 µm to 50 µm, inclusive, and may range from 1 µm to 20 µm, inclusive. The thickness of the metal paste layer is an average value of the thicknesses of the metal paste layer at any five points in a section of the metal paste layer in the thickness direction.

(Separating Member)

The separating member has an insulating property. The separating member covers at least a part of the surface of the separation part. This makes it easy to prevent a short circuit between the anode part and the cathode lead-out layer.

The separating member may be a conventionally known insulating tape (resist tape). Alternatively, the separation part may be formed by attaching a composition containing an insulating resin similar to the first insulating member.

[Electrolytic Capacitor]

An electrolytic capacitor according to the present exemplary embodiment includes the capacitor element described above.

The electrolytic capacitor may include a plurality of the capacitor elements. The plurality of the capacitor elements are stacked. The number of the stacked capacitor elements is not limited to particular numbers, and ranges, for example, from 2 to 20, inclusive. The anode parts of the stacked capacitor elements are joined by welding and electrically connected to each other. The cathode lead-out layers of the stacked capacitor elements are also electrically connected to each other.

At least one of the plurality of capacitor elements is the capacitor element according to the present exemplary embodiment. The others may be conventionally known capacitor elements. Preferably, all of the plurality of capacitor elements disposed in the electrolytic capacitor are the capacitor elements according to the present exemplary embodiment.

(Exterior Body)

The electrolytic capacitor may include an exterior body that seals the capacitor element. The exterior body protects the capacitor element from impact, moisture, and the like.

The exterior body includes the first sealing member. It is preferable that the first sealing member has no fluidity at a temperature of more than or equal to 230° C. This inhibits the first sealing member from flowing during reflow, and thus the capacitor element can be protected. On the other hand, since the insulating member included in the capacitor element flows at a temperature of more than or equal to 230° C., it is possible to close the crack generated in the exterior body at the time of reflow.

The first sealing member contains a first sealing resin. The first sealing resin is not limited to particular kinds. Examples of the first sealing resin include a curable resin and an engineering plastic. Examples of the curable resin include various curable resins exemplified as the first curable resin. The engineering plastic includes a general engineering plastic and a super engineering plastic. Examples of the engineering plastic include polyimide and polyamide-imide.

Among them, the first sealing member preferably contains a curable resin (hereinafter referred to as second curable resin). The first sealing member may contain the second curable resin as a cured product, a half-cured product, or an uncured product. The first sealing member may be a resin composition containing the second curable resin. The resin composition may contain, for example, the second curable resin, a curing agent, a curing accelerator, a flame retardant, a filler, a coupling agent, a colorant, a release agent, and an inorganic ion scavenger.

The Tg of the cured product of the second curable resin is preferably higher than the Tg of the cured product of the first curable resin. This makes it easy to inhibit the first sealing member from flowing even when heating is performed under the condition that the insulating member flows. The Tg of the cured product of the second curable resin is more preferably more than or equal to 140° C., and more preferably more than or equal to 150° C. Preferable examples of such a second curable resin include a biphenyl epoxy resin and an O-cresol novolac epoxy resin.

The exterior body preferably includes the first sealing member having no fluidity at a temperature of more than or equal to 230° C. and the second sealing member having fluidity at least partially at a temperature of more than or equal to 230° C. At this time, the second sealing member is preferably dispersed in the first sealing member so as to close the crack generated in the first sealing member.

Such a second sealing member may be derived from the insulating member included in the capacitor element. In other words, the second sealing member may be at least a part of the insulating member that has flowed in the reflow step and is dispersed in the first sealing member.

Alternatively, the second sealing member may be added to the first sealing member in a sealing step. In this case, the second sealing member preferably contains a curable resin similar to that exemplified as the first curable resin, that is, a bifunctional epoxy resin, preferably a bisphenol epoxy resin. The curable resin (hereinafter referred to as third curable resin) contained in the second sealing member may be a cured product, a half-cured product, or an uncured product. The second sealing member may be a resin composition containing the third curable resin. The resin composition may contain, for example, the third curable resin, a curing agent, a curing accelerator, a flame retardant, a filler, a coupling agent, a colorant, a release agent, and an inorganic ion scavenger. The composition of the second sealing member and the composition of the insulating member may be the same or different.

(Lead Frame)

The electrolytic capacitor usually includes a lead frame connected to the capacitor element. An anode lead frame is welded to, for example, the anode part. A cathode lead frame is joined to the cathode lead-out layer via a conductive adhesive or solder, or by resistance welding or laser welding. The conductive adhesive is, for example, a mixture of a curable resin and carbon particles or metal particles.

A material for the lead frame is not limited to particular kinds as long as the material is electrochemically and chemically stable and has conductivity, and may be a metal or a nonmetal. The shape thereof is limited to particular shapes either. The thickness of the lead frame (distance between principal surfaces of the lead frame) ranges preferably from 25 µm to 200 µm, inclusive, and more preferably from 25 µm to 100 µm, inclusive, from the viewpoint of height reduction.

A part of the lead frame is sealed by the exterior body together with the capacitor element. A part of the lead frame exposed from the exterior body is joined to the substrate via solder. The lead frame may be covered by a metallic material to assist solder joint. In the reflow step, solder joint becomes strong with the metallic material melted together with the solder.

In the reflow step, the metallic material covering the lead frame sealed by the exterior body also melts. The molten metallic material flows on the lead frame and flows out of the exterior body. Then, a void is formed between the lead frame and the exterior body. This void communicates with the outside. Oxygen may enter the inside of the electrolytic capacitor from the outside through the void.

The capacitor element according to the present exemplary embodiment includes an insulating member that flows during reflow. The insulating member can close the void formed between the lead frame and the exterior body. The entry of oxygen from this void is therefore inhibited.

The metallic material is not limited to particular kinds as long as it melts in the reflow step. The metallic material may be appropriately selected in consideration of the peak temperature of the reflow step and the Tg of the cured product of the first curable resin. The melting point of the metallic material is, for example, less than 230° C., and is preferably higher than the Tg of the cured product of the first curable resin. This allows the insulating member to move quickly so as to fill the void when the metallic material flows out to the outside.

Examples of such a metallic material include Sn and solder materials specified in JIS Z 3282-1999. Examples of the solder material include lead-containing solders such as Sn—Pb based, Pb—Sn based, Sn—Pb—Sb based, Sn—Pb—Bi based, Sn—Pb—Cd based, Sn—Pb—Cu based, Sn—Pb—Ag based, Pb—Ag based, and Pb—Ag—Sn based solders, and lead-free solders such as Sn—Sb based, Sn—Bi based, Sn—Cu based, Sn—Cu—Ag based, Sn—In based, Sn—In—Ag—Bi based, Sn—Ag based, Sn—Ag—Cu based, Sn—Ag—Bi—Cu based, Sn—Zn based, and Sn—Bi—Zn based solders.

From the viewpoint of oxygen blocking property, it is preferable that the metallic material and the insulating member are strongly adhered to each other. For example, the joint strength between the insulating member and the metallic material is preferably more than or equal to 8.5 MPa, and more preferably more than or equal to 9.0 MPa.

The measurement of the above joint strength was performed under test piece shapes and test conditions in accordance with ISO 19095-1 to 4, which is an international standard for resin-metal joint characteristics evaluation test method. Specifically, the test was performed using a superposed test piece (type B) with a joint area of 50 mm2. The strength (that is, shear strength) when the insulating member side of the two-layer structure of the mold resin and the insulating member is peeled off from the lead frame is defined as the joint strength between the insulating member and the metallic material.

From the viewpoint of further enhancing the oxygen blocking property, it is preferable that the insulating member is disposed at least at a junction with the lead frame on the surface of the capacitor element. Since the fluidity of the insulating member and the fluidity of the metallic material are different, the void generated by the movement of the metallic material is quickly closed by the movement of the insulating member.

Figure 4:
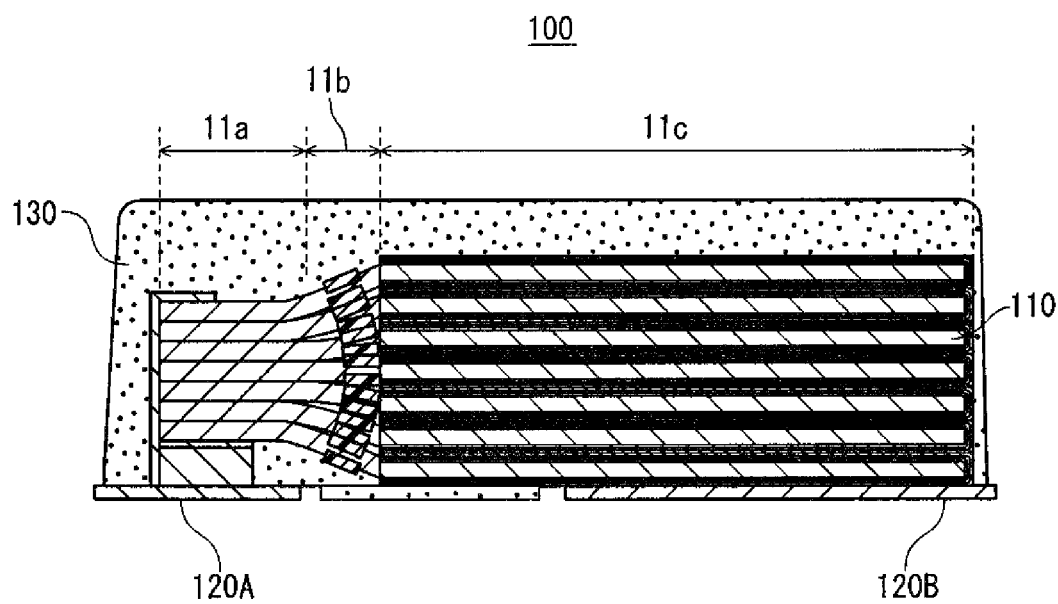
FIG. 4 is a sectional view schematically illustrating an electrolytic capacitor according to an exemplary embodiment of the present disclosure.

FIG. 4 is a sectional view schematically illustrating the electrolytic capacitor according to the present exemplary embodiment. Electrolytic capacitor 100 includes one or more capacitor elements 110, anode lead frame 120A joined to anode part 11*a*, cathode lead frame 120B joined to the cathode lead-out layer, and exterior body 130 that seals capacitor element 110.

[Insulating Material for Electrolytic Capacitor]

The present exemplary embodiment includes an insulating material for forming the above insulating member. The insulating material according to the present embodiment contains the above first curable resin. The cured product of the first curable resin has a glass transition temperature of less than or equal to 150° C. The first curable resin preferably contains a bifunctional epoxy resin. Among them, the first curable resin preferably contains a bisphenol type epoxy resin.

[Mount Board]

The mount board according to the present exemplary embodiment includes a substrate and the electrolytic capacitor mounted on the substrate. The electrolytic capacitor is joined with solder to the substrate, for example. The solder is not limited to particular kinds, and for example, a solder material exemplified as the metallic material is used.

The substrate is not limited to particular kinds. Examples of the substrate include conventionally known glass substrates, resin substrates, ceramic substrates, and silicon substrates, as well as substrates having stretchability or flexibility referred to as flexible substrates, stretchable substrates, and the like.

[Method for Manufacturing Capacitor Element]

The capacitor element according to the present exemplary embodiment is manufactured by, for example, a method including a step of preparing an anode body having a porous part, a step of forming a dielectric layer on at least a part of a surface of the anode body, a definition step of defining the anode body on which the dielectric layer is formed into an anode part, a cathode formation part, and a separation part between the anode part and the cathode formation part, a step of forming a cathode lead-out layer covering at least a part of the solid electrolyte layer to obtain a precursor of the capacitor element, and an application step of applying a material of an insulating member to a predetermined position of the precursor of the capacitor element.

After the definition step and before the step of forming the cathode lead-out layer, a step of compressing or removing a part of the porous part in the separation part to form a thin-walled part in the separation part, and a step of disposing a separating member on at least a part of a surface of the thin-walled part may be performed.

In the application step, the whole precursor of the capacitor element may be immersed in a raw material liquid containing an insulating resin. This makes it possible to attach the insulating resin to the inside of the cathode lead-out layer and surface of the cathode lead-out layer, the inside of the anode part and surface of the anode part, and the inside of the separation part. That is, in one step, the first insulating member, the second insulating member, and the third insulating member can be disposed at predetermined positions. In this case, the first insulating member, the second insulating member, and the third insulating member have the same composition.

Further, the entire stacked body in which a plurality of precursors of capacitor element are stacked may be immersed in a raw material liquid containing an insulating resin. This makes it possible to attach the insulating resin not only to the inside of the cathode lead-out layer and surface of the cathode lead-out layer, the inside of the anode part and surface of the anode part, and the inside of the separation part but also between the separation parts (or separating members) of adjacent capacitor elements.

When the material of each insulating member is applied by a method other than the above method, the application step may include a step of applying the material of the first insulating member to the cathode lead-out layer, a step of applying the material of the second insulating member to the anode part, and a step of applying the material of the third insulating member to the separation part. The order of the above steps is not limited.

Figure 5:
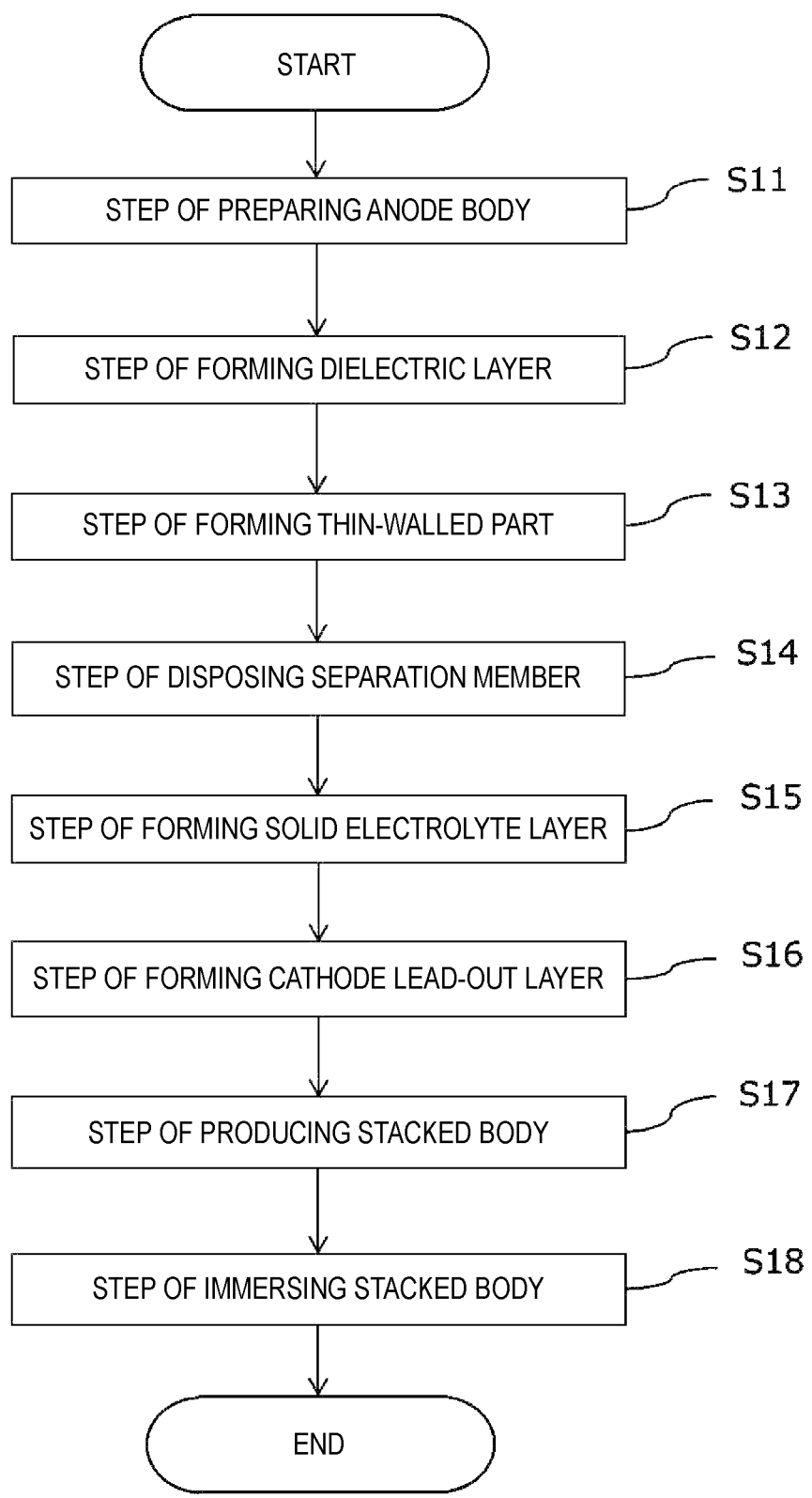
FIG. 5 is a flowchart showing a method for manufacturing a capacitor element according to an exemplary embodiment of the present disclosure.

Hereinafter, a method for manufacturing a capacitor element according to the present exemplary embodiment will be described by taking, as an example, a case where a plurality of precursors of capacitor element are stacked in the application step, and the entire stacked body obtained is immersed in a raw material liquid containing an insulating resin. FIG. 5 is a flowchart showing a method for manufacturing the capacitor element according to the present exemplary embodiment.

(1) Step of Preparing Anode Body (S11)

As a raw material of the anode body, for example, a metal foil containing a valve metal is used.

At least one principal surface of the metal foil is roughened. By the roughening, a porous part including a large number of fine pores is formed at least on the principal surface side of the metal foil.

The roughening is performed by, for example, electrolytic etching of the metal foil. The electrolytic etching can be performed by, for example, a direct current electrolyzing method or an alternating current electrolyzing method. The etching conditions are not limited to particular conditions, and are appropriately set according to a depth of the porous region, a type of the valve metal, and the like.

(2) Step of Forming Dielectric Layer (S12)

A dielectric layer is formed on a surface of the anode body. A method of forming the dielectric layer is not limited to particular methods. The dielectric layer can be formed, for example, by subjecting the anode body to an anodizing treatment. In the anodizing treatment, for example, the anode body is immersed in an anodizing liquid, such as an ammonium adipate solution, and subjected to a heat treatment. The anode body may be immersed in an anodizing liquid, and a voltage may be applied.

(3) Step of Defining Anode Body and Forming Thin-Walled Part in Separation Part (S13)

The anode body on which the dielectric layer is formed is defined into an anode part, a cathode formation part, and a separation part between the anode part and the cathode formation part. Then, a thin-walled part is formed in at least a part of the separation part. For example, the thin-walled part may be formed by compressing or partially removing the porous part in at least a part of the separation part. Compression and removal may be combined as necessary. The compression can be performed by press working or the like. The porous part can be removed by cutting, laser processing, or the like.

(4) Step of Disposing Separating Member on Surface of Separation Part (S14)

A separating member is disposed on a surface of the separation part. Disposing the separating member prior to the step of forming the solid electrolyte layer can inhibit the conductive polymer from creeping up toward the anode part side when the solid electrolyte layer is formed.

The separating member is disposed, for example, by attaching an insulating tape (such as a resist tape) to the surface of the separation part. Alternatively, the material of the separating member may be applied to the separation part. The material of the separating member is applied to the separation part by a printing method, a method using a dispenser, a transfer method, or the like.

(5) Step of Forming Solid Electrolyte Layer (S15)

A solid electrolyte layer is formed on a surface of the dielectric layer.

The solid electrolyte layer can be formed by chemical polymerization or electrolytic polymerization of a raw material monomer or oligomer under the presence of the anode body. The solid electrolyte layer may be formed by applying to the dielectric layer a solution in which a conductive polymer is dissolved or a dispersion liquid in which a conductive polymer is dispersed.

The raw material monomer or oligomer is a monomer or oligomer to be a raw material of the conductive polymer. Examples thereof include pyrrole, aniline, thiophene, and derivatives thereof. A polymerization liquid to be used for the chemical polymerization or the electrolytic polymerization may contain the dopant described above in addition to the raw material monomer or oligomer.

(6) Step of Forming Cathode Lead-Out Layer (S16)

A cathode lead-out layer is formed by sequentially applying, for example, a carbon paste and a silver paste to the surface of the solid electrolyte layer. Whereby a precursor of the capacitor element is obtained.

(7) Step of Producing Stacked Body (S17)

A plurality of precursors of capacitor element are stacked, and their anode parts are joined to each other to produce a stacked body. The anode parts are joined to each other by welding, caulking, or the like to be electrically connected. The welding method is not limited to particular methods, and may be laser welding or resistance welding.

(8) Step of Immersing Stacked Body in Raw Material Liquid of Insulating Member (S18)

The entire obtained stacked body is immersed in a raw material liquid of the insulating member. This causes the raw material liquid to attach to the inside of the cathode lead-out layer and surface of the cathode lead-out layer, the inside of the anode part and surface of the anode part, the inside and surface of the separation part, and between the separation parts (or the separating members) of adjacent precursors of capacitor element.

Thereafter, by performing drying, heat treatment, and the like as necessary, the first insulating member is disposed inside of the cathode lead-out layer and on the surface of the cathode lead-out layer, the second insulating member is disposed inside of the anode part and on the surface of the anode part, the third insulating member is disposed inside of the separation part and on the surface of the separation part, and the insulating member is disposed between the separation parts (or the separating members) of the adjacent capacitor elements. In this manner, stacked capacitor elements are obtained.

The application amount of the raw material liquid is not limited to particular amounts. The application amount of the raw material liquid is adjusted by, for example, the concentration and viscosity of the raw material liquid, and the immersion time.

It is preferable that the viscosity of the raw material liquid is not excessively high. The viscosity of the raw material liquid measured at 25° C. using a dynamic viscoelasticity measuring device is preferably less than or equal to 6000 mPa·s, and preferably less than or equal to 5500 mPa·s. When the viscosity of the raw material liquid is in this range, the raw material liquid easily penetrates into the cathode lead-out layer. The viscosity of the raw material liquid is preferably more than or equal to 5 mPa·s, and preferably more than or equal to 50 mPa·s. The viscosity is measured, for example, using a viscoelasticity measuring device under the conditions of a measurement temperature of 25° C. and a measurement time of 180 seconds (the same applies hereinafter).

From the viewpoint of enhancing the oxygen blocking effect, it is preferable that the proportion of the insulating resin in the raw material liquid is large. The proportion of the insulating resin in the raw material liquid is preferably more than or equal to 80 mass %, and preferably more than or equal to 90 mass %. In particular, it is preferable that the raw material liquid contains no liquid component that dissolves or disperses the insulating resin. The proportion of the liquid component in the raw material liquid is preferably less than 10 mass %, and more preferably less than 5 mass %. The liquid component is not limited to particular components, and is appropriately selected according to the type of the curable resin. The liquid component may be water, a non-aqueous solvent, or a mixture thereof. The non-aqueous solvent is a generic term for liquids excluding water, and examples thereof include organic solvents and ionic liquids.

After the raw material liquid is applied to the precursor of the capacitor element to obtain the capacitor element, a plurality of capacitor elements may be stacked.

The raw material liquid may be applied to a predetermined position of the precursor of the capacitor element by a coating method or a dispensing method using various coaters or dispensers, transfer (roller transfer, etc.), or the like. At this time, the composition, viscosity, and the like of the raw material liquid may be changed according to the position to be applied.

[Method for Manufacturing Electrolytic Capacitor]

Figure 6:
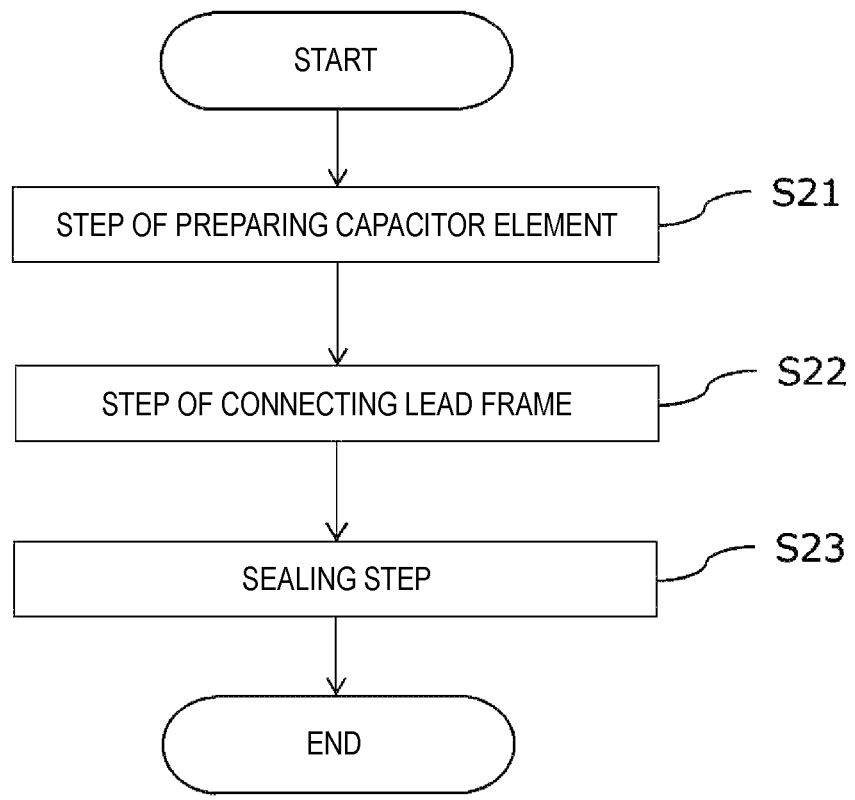
FIG. 6 is a flowchart showing a method for manufacturing an electrolytic capacitor according to an exemplary embodiment of the present disclosure.

The electrolytic capacitor is manufactured, for example, by a method including a step of preparing one or more capacitor elements obtained by the above method, a step of electrically connecting a lead frame to the capacitor elements, and a step of sealing a part of the capacitor elements and the lead frame with an exterior body. Here, a method for manufacturing an electrolytic capacitor including a plurality of stacked capacitor elements will be described. FIG. 6 is a flowchart showing the method for manufacturing an electrolytic capacitor according to the present exemplary embodiment.

(a) Step of Preparing Capacitor Element (S21)

Stacked capacitor elements are produced by the methods (1) to (8) described above.

(b) Step of Connecting Lead Frame (S22)

The anode lead frame is electrically connected to the anode part of at least one capacitor element, and the cathode lead frame is electrically connected to the cathode lead-out layer. The anode part and the anode lead frame are, for example, welded and electrically connected. The cathode lead-out layer and the cathode lead frame are electrically connected to each other, for example, by adhering the cathode lead-out layer and the cathode lead frame via a conductive adhesive.

(c) Sealing Step (S23)

A part of the stacked capacitor element and lead frame is sealed with the first sealing member. The sealing is performed using a molding technique such as injection molding, insert molding, or compression molding. For example, a material (sealing material) of the first sealing member containing a curable resin or a thermoplastic resin is filled using a predetermined mold so as to cover one end of the stacked capacitor element and the lead frame, and then heating or the like is performed.

It is preferable that the viscosity of the sealing material is not excessively low. The viscosity of the sealing material measured at 25° C. using a dynamic viscoelasticity measuring device is usually more than or equal to 4000 mPa·s and more than or equal to 10,000 mPa·s. The sealing material does not have to have fluidity at 25° C. In other words, the sealing material may be viscous or solid at 25° C. to an extent that viscosity evaluation is difficult. When the viscosity of the sealing material is in this range, the moisture resistance and impact resistance of the electrolytic capacitor are likely to increase. The viscosity of the sealing material flowing at 25° C. may be, for example, less than or equal to 100,000 mPa·s, or less than or equal to 60,000 mPa·s.

[Method for Manufacturing Mount Board]

Figure 7:
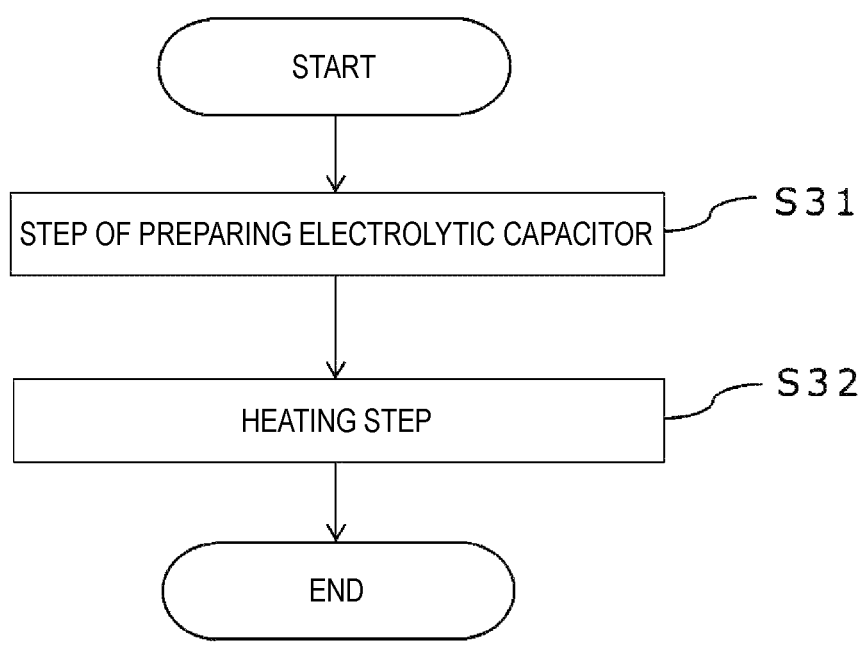
FIG. 7 is a flowchart showing a method for manufacturing a mount board according to an exemplary embodiment of the present disclosure.

The mount board is manufactured, for example, by a method including a step of preparing a substrate on which the electrolytic capacitor is mounted and a step of heating the electrolytic capacitor at a temperature of more than or equal to 230° C. FIG. 7 is a flowchart showing a method for manufacturing a mount board according to the present exemplary embodiment.

(i) Step of Preparing Electrolytic Capacitor (S31)

An electrolytic capacitor is produced by the methods (a) to (c) described above.

(ii) Heating (Reflow) Step (S32)

The electrolytic capacitor is placed on a substrate with a solder material interposed therebetween, and heated at a temperature of more than or equal to 230° C. The electrolytic capacitor is thus mounted on the substrate. At this time, the insulating member flows and becomes dispersed in the exterior body to close a minute crack generated in the exterior body.

EXAMPLES

Hereinafter, the present disclosure will be specifically described based on Examples and Comparative Examples. The present disclosure is not limited to the following Examples.

Example 1

Electrolytic capacitor A1 including a stacked body in which seven capacitor elements were stacked was produced in the following manner.

(1) Production of Capacitor Element

An aluminum foil (thickness: 100 μm) was prepared as a base material, and a surface of the aluminum foil was subjected to an etching treatment to obtain an anode body including a porous part (thickness of aluminum foil on one principal surface side: 35 μm, thickness of aluminum foil on the other principal surface side: 35 μm). A dielectric layer containing aluminum oxide ($Al_2O_3$) was formed on the surface of the anode body by immersing the anode body in a phosphoric acid solution (liquid temperature: 70° C.) having a concentration of 0.3 mass % and applying a DC voltage of 70 V for 20 minutes.

The anode body was defined into an anode part, a cathode formation part, and a separation part between the anode part and the cathode formation part, and a thin-walled part (thickness: 35 μm) was formed by compressing a part of the separation part by press working. An insulating resist tape (separating member) was attached to the thin-walled part.

The anode body on which the dielectric layer was formed was immersed in a liquid composition containing a conductive material to form a precoat layer.

A polymerization liquid containing pyrrole (monomer of a conductive polymer), naphthalenesulfonic acid (dopant), and water was prepared. The anode body on which the dielectric layer and the precoat layer were formed was immersed in the obtained polymerization liquid, and electrolytic polymerization was performed at an applied voltage of 3 V to form a solid electrolyte layer.

A dispersion liquid in which graphite particles were dispersed in water was applied to the solid electrolyte layer and then dried to form a carbon layer on the surface of the solid electrolyte layer. Next, a silver paste containing silver particles and a binder resin (epoxy resin) was applied onto the surface of the carbon layer, and then the binder resin was cured by heating to form a metal paste layer (silver-paste layer, thickness 15 μm). A cathode lead-out layer composed of a carbon layer and a metal paste layer was thus formed, and a precursor of a capacitor element was obtained.

The obtained seven precursors were stacked, and the anode parts were joined to each other by laser welding to obtain a stacked body.

The obtained stacked body was immersed in a raw material liquid (solvent-free type, viscosity (25° C.) 100 mPa·s) containing a two-liquid curable bisphenol F type epoxy resin (Tg 100° C.). Next, the stacked body was subjected to a heat treatment to cure the impregnated raw material liquid. A capacitor element in which an insulating member was disposed was thus obtained. As the raw material liquid, a liquid A composed of 4-tert-butylphenyl glycidyl ether:bisphenol F type epoxy resin (mass ratio)=75:25 and a liquid B containing an acid anhydride curing agent and an imidazole curing accelerator were mixed and used.

The disposition of the insulating member was checked by Raman spectroscopy, Fourier transform infrared spectroscopy, TEM/EDS (transmission electron microscope/energy dispersive X-ray spectroscopy), or TEM/EELS (transmission electron microscope/electron beam energy loss spectroscopy). In the stacked body, the insulating member was disposed inside the anode body, inside the separation part, inside the cathode lead-out layer, and between the separating members of adjacent capacitor elements. The insulating member was disposed from the outermost surface of the cathode lead-out layer to a depth of 0.005 μm. It was confirmed that the insulating member disposed from the outermost surface of the cathode lead-out layer to a depth of 0.005 μm was a cured product. In the metal paste layer, the ratio of the elements derived from the insulating material to silver atoms was 65 atom %.

The insulating member was disposed from the outermost surface of the anode part to a depth of 0.005 μm. The insulating member was disposed from the outermost surface of the separation part to a depth of 0.005 μm below the resist tape.

(2) Assembly of Electrolytic Capacitor

Two lead frames (Sn-plated copper) were joined to the stacked capacitor elements. Next, the stacked capacitor element and a part of each lead frame were sealed with a sealing material (material of the first sealing member) containing a biphenyl epoxy resin (Tg 180° C.) to form an exterior body, whereby electrolytic capacitor A1 was completed.

Example 2

A capacitor element was produced in the same manner as in Example 1 except that the cathode lead-out layer was impregnated with the insulating member so that the insulating member was disposed from the outermost surface of the cathode lead-out layer to a depth of 0.005 whereby electrolytic capacitor A2 was completed.

It was confirmed that the insulating member disposed inside the cathode lead-out layer was a cured product. In the metal paste layer, the ratio of the elements derived from the insulating material to silver atoms was 65 atom %. The insulating member was also disposed on the surface of the cathode lead-out layer. The thickness of the insulating member covering the surface of the cathode lead-out layer was 4.8 μm.

The insulating member was also disposed on the surface of the anode part and from the outermost surface of the anode part to a depth of 0.005 μm. The thickness of the insulating member covering the surface of the anode part was 4.8 μm. The insulating member was further disposed on the surface of the separation part and from the outermost surface of the separation part to a depth of 0.005 μm below the resist tape. The thickness of the insulating member covering the surface of the separation part was 4.8

Example 3

A capacitor element was produced in the same manner as in Example 1 except that the cathode lead-out layer was impregnated with the insulating member so that the insulating member was disposed from the outermost surface of the cathode lead-out layer to a depth of 0.01 μm, whereby electrolytic capacitor A3 was completed.

It was confirmed that the insulating member disposed inside the cathode lead-out layer was a cured product. In the metal paste layer, the ratio of the elements derived from the insulating material to silver atoms was 66 atom %.

The insulating member was also disposed from the outermost surface of the anode part to a depth of 0.01 μm. The insulating member was further disposed from the outermost surface of the separation part to a depth of 0.01 μm below the resist tape.

Example 4

A capacitor element was produced in the same manner as in Example 1 except that the cathode lead-out layer was impregnated with the insulating member so that the insulating member was disposed from the outermost surface of the cathode lead-out layer to a depth of 0.01 μm, whereby electrolytic capacitor A4 was completed.

It was confirmed that the insulating member disposed inside the cathode lead-out layer was a cured product. In the metal paste layer, the ratio of the elements derived from the insulating member to silver atoms was 66 atom %. The insulating member was also disposed on the surface of the cathode lead-out layer. The thickness of the insulating member covering the surface of the cathode lead-out layer was 5.2 μm.

The insulating member was also disposed on the surface of the anode part and from the outermost surface of the anode part to a depth of 0.01 μm. The thickness of the insulating member covering the surface of the anode part was 5.2 μm. The insulating member was further disposed on the surface of the separation part and from the surface of the separation part to a depth of 0.01 μm below the resist tape. The thickness of the insulating member covering the surface of the separation part was 5.2 μm.

Example 5

A capacitor element was produced in the same manner as in Example 1 except that the cathode lead-out layer was impregnated with the insulating member so that the insulating member was disposed from the outermost surface of the cathode lead-out layer to a depth of 0.05 μm, whereby electrolytic capacitor A5 was completed.

It was confirmed that all of the insulating member disposed inside the cathode lead-out layer was a cured product. In the metal paste layer, the ratio of the elements derived from the insulating member to silver atoms was 67 atom %.

The insulating member was also disposed from the outermost surface of the anode part to a depth of 0.05 μm. The insulating member was further disposed from the outermost surface of the separation part to a depth of 0.05 μm below the resist tape.

Example 6

A capacitor element was produced in the same manner as in Example 1 except that the cathode lead-out layer was impregnated with the insulating member so that the insulating member was disposed from the outermost surface of the cathode lead-out layer to a depth of 0.05 μm, whereby electrolytic capacitor A6 was completed.

It was confirmed that all of the insulating member disposed inside the cathode lead-out layer was a cured product. In the metal paste layer, the ratio of the elements derived from the insulating member to silver atoms was 67 atom %. The insulating member was also disposed on the surface of the cathode lead-out layer. The thickness of the insulating member covering the surface of the cathode lead-out layer was 5.0 μm.

The insulating member was also disposed on the surface of the anode part and from the outermost surface of the anode part to a depth of 0.05 μm. The thickness of the insulating member covering the surface of the anode part was 5.0 μm. The insulating member was further disposed on the surface of the separation part and from the outermost surface of the separation part to a depth of 0.05 μm below the resist tape. The thickness of the insulating member covering the surface of the separation part was 5.0 μm.

Example 7

A capacitor element was produced in the same manner as in Example 1 except that the cathode lead-out layer was impregnated with the insulating member so that the insulating member was disposed from the outermost surface of the cathode lead-out layer to a depth of 0.1 μm, whereby electrolytic capacitor A7 was completed.

It was confirmed that all of the insulating member disposed inside the cathode lead-out layer was a cured product. In the metal paste layer, the ratio of the elements derived from the insulating member to silver atoms was 67 atom %. The insulating member was also disposed on the surface of the cathode lead-out layer. The thickness of the insulating member covering the surface of the cathode lead-out layer was 5.1 μm.

The insulating member was also disposed on the surface of the anode part and from the outermost surface of the anode part to a depth of 0.1 μm. The thickness of the insulating member covering the surface of the anode part was 5.1 μm. The insulating member was further disposed from the outermost surface of the separation part to a depth of 0.1 μm below the resist tape.

Example 8

A capacitor element was produced in the same manner as in Example 1 except that the cathode lead-out layer was impregnated with the insulating member so that the insulating member was disposed from the outermost surface of the cathode lead-out layer to a depth of 1.0 μm, whereby electrolytic capacitor A8 was completed.

It was confirmed that the insulating member disposed from the outermost surface of the cathode lead-out layer to a depth of 0.9 μm was a cured product. In the metal paste layer, the ratio of the elements derived from the insulating member to silver atoms was 85 atom %. The insulating member was also disposed on the surface of the cathode lead-out layer. The thickness of the insulating member covering the surface of the cathode lead-out layer was 5.1 μm.

The insulating member was also disposed on the surface of the anode part and from the outermost surface of the anode part to a depth of 1.0 μm. The thickness of the insulating member covering the surface of the anode part was 5.1 μm. The insulating member was further disposed on the surface of the separation part and from the outermost surface of the separation part to a depth of 1.0 μm below the resist tape. The thickness of the insulating member covering the surface of the separation part was 5.1 μm.

Example 9

A capacitor element was produced in the same manner as in Example 1 except that the cathode lead-out layer was impregnated with the insulating member so that the insulating member was disposed from the outermost surface of the cathode lead-out layer to a depth of 5.0 μm, whereby electrolytic capacitor A9 was completed.

It was confirmed that all of the insulating member disposed inside the cathode lead-out layer was a cured product. In the metal paste layer, the ratio of the elements derived from the insulating member to silver atoms was 170 atom %. The insulating member was also disposed on the surface of the cathode lead-out layer. The thickness of the insulating member covering the surface of the cathode lead-out layer was 5.0 μm.

The insulating member was also disposed on the surface of the anode part and from the outermost surface of the anode part to a depth of 5.0 μm. The thickness of the insulating member covering the surface of the anode part was 5.0 μm. The insulating member was further disposed on the surface of the separation part and from the outermost surface of the separation part to a depth of 5.0 μm below the resist tape. The thickness of the insulating member covering the surface of the separation part was 5.0 μm.

Example 10

A capacitor element was produced in the same manner as in Example 1 except that the cathode lead-out layer was impregnated with the insulating member so that the insulating member was disposed from the outermost surface of the cathode lead-out layer to a depth of 10.0 μm, whereby electrolytic capacitor A10 was completed.

It was confirmed that all of the insulating member disposed inside the cathode lead-out layer was a cured product. In the metal paste layer, the ratio of the elements derived from the insulating member to silver atoms was 276 atom %. The insulating member was also disposed on the surface of the cathode lead-out layer. The thickness of the insulating member covering the surface of the cathode lead-out layer was 4.9 μm.

The insulating member was also disposed on the surface of the anode part and from the outermost surface of the anode part to a depth of 10.0 μm. The thickness of the insulating member covering the surface of the anode part was 4.9 μm. The insulating member was further disposed on the surface of the separation part and from the outermost surface of the separation part to a depth of 10.0 μm below the resist tape. The thickness of the insulating member covering the surface of the separation part was 4.9

Example 11

A capacitor element was produced in the same manner as in Example 1 except that the cathode lead-out layer was impregnated with the insulating member so that the insulating member was disposed from the outermost surface of the cathode lead-out layer to a depth of 15.0 μm, whereby electrolytic capacitor A11 was completed.

It was confirmed that the insulating member disposed from the outermost surface of the cathode lead-out layer to a depth of 12.0 μm was a cured product. In the metal paste layer, the ratio of the elements derived from the insulating member to silver atoms was 283 atom %. The insulating member was also disposed on the surface of the cathode lead-out layer. The thickness of the insulating member covering the surface of the cathode lead-out layer was 5.2 μm.

The insulating member was also disposed on the surface of the anode part and from the outermost surface of the anode part to a depth of 15.0 μm. The thickness of the insulating member covering the surface of the anode part was 5.2 μm. The insulating member was further disposed on the surface of the separation part and from the outermost surface of the separation part to a depth of 15.0 μm below the resist tape. The thickness of the insulating member covering the surface of the separation part was 5.2 μm.

Comparative Example 1

Electrolytic capacitor R1 was produced in the same manner as in Example 1 except that the precursor was not impregnated with the insulating member.
[Evaluation]
(1) Dispersion State of Insulating Member To mount electrolytic capacitors A1 to A11 produced above on a substrate, a reflow treatment in accordance with IPC/JEDEC J-STD-020 of a maximum temperature of 235° C. was performed. Thereafter, the position of the insulating member was evaluated by Raman spectroscopy. In all the electrolytic capacitors A1 to A11, it was confirmed that part of the insulating member was dispersed in the first sealing member.

(2) Adhesive Strength Test

A coating film of the insulating member was formed on the surface of a lead frame base material using the raw material liquid of the insulating member, and then a test piece having a joint area of 50 mm² was formed and joined using a mold resin. Varying loads were applied to the test piece, and the shear peeling strength when the test piece was peeled off from the lead frame was measured. The joint strength between the two-layer structure of the mold resin and the insulating member and the lead frame was 8.5 MPa.

(3) Electrostatic Capacitance and ESR

For electrolytic capacitors A1 to A11 and R1 produced above, the change rates of electrostatic capacitance and ESR were evaluated by the following procedure.

Under an environment of 20° C., an initial electrostatic capacitance value C0 (μg) and an initial ESR value X0 (mΩ) of each electrolytic capacitor at a frequency of 100 kHz were measured using an LCR meter for four-terminal measurement. Next, a rated voltage was applied to the electrolytic capacitor at a temperature of 145° C. for 500 hours (heat resistance test). Thereafter, the electrostatic capacitance value C1 (μF) and the ESR value X1 (mΩ) were measured in the same manner as described above. Then, a value obtained by subtracting the initial electrostatic capacitance value C0 from the electrostatic capacitance value C1 was divided by the initial electrostatic capacitance value C0 and multiplied by 100 to obtain a change rate of electrostatic capacitance (%), and a value obtained by subtracting the initial ESR value X0 from the ESR value X1 was divided by the initial ESR value X0 and multiplied by 100 to obtain a change rate of ESR (%). The results are shown in Table 1.

TABLE 1

| Electrolytic capacitor | Change rate of electrostatic capacitance | Change rate of ESR value |
| --- | --- | --- |
| A1 | −55% | 276% |
| A2 | −52% | 267% |
| A3 | −23% | 68% |
| A4 | −22% | 65% |
| A5 | −21% | 53% |
| A6 | −20% | 50% |
| A7 | −19% | 47% |
| A8 | −8% | 38% |
| A9 | −6% | 32% |
| A10 | −4% | 29% |
| A11 | −3% | 27% |
| R1 | −63% | 450% |

In electrolytic capacitors A1 to A11, the change rates of electrostatic capacitance and ESR before and after the heat resistance test were smaller than those in Comparative Example 1. It is considered that the insulating member (epoxy resin) having penetrated inside the cathode lead-out layer inhibited air from contacting the solid electrolyte layer and inhibited the conductive polymer from deteriorating, which improved the heat resistance of the electrolytic capacitor in electrolytic capacitors A1 to A11.

The electrolytic capacitor according to the present disclosure inhibits the conductive polymer contained in the solid electrolyte layer from deteriorating even when it is exposed to a high-temperature atmosphere and can inhibit the electrostatic capacitance from lowering. The electrolytic capacitor can also inhibit ESR from increasing. Therefore, the electrolytic capacitor can be used in various applications such as applications requiring low ESR and high electrostatic capacitance of the electrolytic capacitor, and applications in which the electrolytic capacitor is exposed to heat. These applications are merely examples, which do not limit the application of the electrolytic capacitor.

The invention claimed is:

1. An electrolytic capacitor comprising:
a plurality of capacitor elements; and
an exterior body that seals the plurality of capacitor elements, wherein:
the capacitor element comprising:
an anode body;
a dielectric layer disposed on a surface of the anode body;
a solid electrolyte layer covering at least a part of the dielectric layer;
a cathode lead-out layer covering at least a part of the solid electrolyte layer; and
an insulating member partially penetrating into the cathode lead-out layer,
the anode body includes an anode part, a cathode formation part, a separation part disposed between the anode part and the cathode formation part, the anode part being not covered by the solid electrolyte layer, the cathode formation part being covered by the solid electrolyte layer,
a separating member is disposed on a surface of the separation part,
the insulating member is disposed between the cathode lead-out layer and the exterior body,
the first curable resin contains a thermosetting epoxy resin,
a penetration depth of the insulating member from an outermost surface of the cathode lead-out layer is more than or equal to 0.001 μm, and
in a first capacitor element and a second capacitor element that are adjacent to each other among the plurality of capacitor elements, the insulating member is further disposed between the separating member of the first capacitor element and the separating member of the second capacitor element.

2. The electrolytic capacitor according to claim 1, wherein the penetration depth of the insulating member from the outermost surface of the cathode lead-out layer is more than or equal to 0.01 μm.

3. The electrolytic capacitor according to claim 1, wherein the insulating member further covers at least a part of the outermost surface of the cathode lead-out layer.

4. The electrolytic capacitor according to claim 1, wherein a penetration depth of a cured product of the first curable resin from the outermost surface of the cathode lead-out layer is more than or equal to 0.001 μm.

5. The electrolytic capacitor according to claim 4, wherein the first curable resin contains a bifunctional epoxy resin.

6. The electrolytic capacitor according to claim 4, wherein the first curable resin contains a bisphenol epoxy resin.

7. The electrolytic capacitor according to claim 1, wherein a cured product of the first curable resin has a glass transition temperature of less than or equal to 150° C.

8. The electrolytic capacitor according to claim 1, wherein:
the cathode lead-out layer includes a metal layer containing a metallic material in a region of the cathode lead-out layer that is located close to the outermost surface,
at least a part of the insulating member penetrates into the metal layer, and
in the metal layer, a ratio of elements derived from the insulating member to elements derived from the metal material is more than or equal to 65 atom %.

9. The electrolytic capacitor according to claim 1, wherein the insulating member is disposed on a surface of the anode part.

10. The electrolytic capacitor according to claim 1, wherein the insulating member penetrates into the anode part.

11. The electrolytic capacitor according to claim 1, wherein the insulating member is disposed on a surface of the separation part.

12. The electrolytic capacitor according to claim 1, wherein the insulating member penetrates into the separation part.

13. The electrolytic capacitor according to claim 1, wherein the insulating member is disposed on the outermost surface of the cathode lead-out layer and a surface of the anode part.

14. The electrolytic capacitor according to claim 1, wherein
the insulating member partially penetrates into the cathode lead-out layer, into the anode part, and into the separation part.

15. The electrolytic capacitor according to claim 1, wherein:
the exterior body includes a first sealing member, and
the first sealing member has no fluidity at a temperature of more than or equal to 230° C.

16. The electrolytic capacitor according to claim 15, wherein:
the exterior body further includes a second sealing member dispersed in the first sealing member, and
at least a part of the second sealing member has fluidity at a temperature of more than or equal to 230° C.

17. The electrolytic capacitor according to claim 16, wherein the second sealing member is derived from the insulating member.

18. The electrolytic capacitor according to claim 15, wherein:
the first sealing member contains a second curable resin, and
a glass transition temperature of a cured product of the second curable resin is higher than a glass transition temperature of a cured product of the first curable resin.

19. A method for manufacturing a mount board, the method comprising:
preparing a substrate on which the electrolytic capacitor according to claim 15 is mounted; and
heating the electrolytic capacitor at a temperature of more than or equal to 230° C.

20. The electrolytic capacitor according to claim 1, further comprising a lead frame connected to the plurality of capacitor elements, wherein the lead frame is covered with a metallic material.

21. The electrolytic capacitor according to claim 20, wherein
the metallic material has a melting point higher than a glass transition temperature of a cured product of the first curable resin.

22. The electrolytic capacitor according to claim 20, wherein a joint strength between the insulating member and the metallic material is more than or equal to 8.5 MPa.

23. The electrolytic capacitor according to claim 20, wherein the insulating member is disposed at least at a junction with the lead frame on a surface of the plurality of capacitor elements.

24. The electrolytic capacitor according to claim 1, wherein
the insulating material penetrates into a part of the cathode lead-out layer, and does not penetrate into a remaining part of the cathode lead-out layer.

25. The electrolytic capacitor according to claim 1, wherein
the separation part is not covered by the solid electrolyte layer and the dielectric layer, and
the separating member is in direct contact with a surface the anode body.

26. The electrolytic capacitor according to claim 1, wherein
the separating member of the first capacitor element contacts the separating member of the second capacitor element.

27. An electrolytic capacitor comprising:
a capacitor element; and
an exterior body that seals the capacitor element, wherein:
the capacitor element comprising:
an anode body;
a dielectric layer disposed on a surface of the anode body;
a solid electrolyte layer covering at least a part of the dielectric layer;
a cathode lead-out layer covering at least a part of the solid electrolyte layer; and
an insulating member partially penetrating into the cathode lead-out layer,
the insulating member is disposed between the cathode lead-out layer and the exterior body,
the insulating member contains a first curable resin,
the first curable resin contains a thermosetting epoxy resin,
at least a part of the insulating member has fluidity at a temperature of more than or equal to 230° C., and
a melt flow rate of the insulating member is more than or equal to 1g/10 minutes.

28. The electrolytic capacitor according to claim 27, wherein at least a part of the insulating member is disposed on a surface of the cathode lead-out layer.

29. The electrolytic capacitor according to claim 27, wherein a penetration depth of the insulating member from an outermost surface of the cathode lead-out layer is more than or equal to 0.001 μm.

30. The electrolytic capacitor according to claim 27, wherein a penetration depth of the insulating member from an outermost surface of the cathode lead-out layer is more than or equal to 0.01 μm.

31. The electrolytic capacitor according to claim 27, wherein
the insulating material penetrates into a part of the cathode lead-out layer, and does not penetrate into a remaining part of the cathode lead-out layer.

32. An electrolytic capacitor comprising:
a capacitor element; and
an exterior body that seals the capacitor element, wherein:
the capacitor element comprises:
an anode body;
a dielectric layer disposed on a surface of the anode body;
a solid electrolyte layer covering at least a part of the dielectric layer;
a cathode lead-out layer covering at least a part of the solid electrolyte layer; and
an insulating member partially penetrating into the cathode lead-out layer,
the insulating member contains a first curable resin,
the first curable resin contains a thermosetting epoxy resin,
the cathode lead-out layer includes a carbon layer disposed on the solid electrolyte layer and a metal layer disposed on the carbon layer, the metal layer containing a plurality of metallic particles and a binder resin,
the metal layer includes a void formed between the plurality of metallic particles in an inside of the metal layer,
the first curable resin is disposed to fill the void in the metal layer, and
the metal layer includes a first layer containing the plurality of metallic particles and the first curable resin.

33. The of electrolytic capacitor according to claim 32, wherein
a thickness of the first layer is more than or equal to 0.001 μm.

* * * * *